Patented Jan. 22, 1935

1,988,753

UNITED STATES PATENT OFFICE 1,988,753

PROCESS FOR PREPARING LUBRICATING OIL DYE STOCK

Sherman S. Shaffer and Egi V. Fasce, Baytown, Tex., assignors to Standard Oil Development Company, a corporation of Delaware No Drawing. Application June 2, 1931, Serial No. 541,744

9 Claims. (Cl. 196—78)

This invention relates to a process for producing a product which will impart a green fluorescence to lubricating oils.

The object of this invention is to provide a process for producing a preparation which when added in small quantities to a lubricating oil stock will impart a green fluorescence to the same when viewed by reflected light and will be further characterized by red or reddish brown color when viewed by transmitted light. The addition of this preparation does not destroy any of the desirable characteristics of the lubricating oil; in many cases it improves not only the cast but also the pour point.

Another object of the invention is to prepare valuable products from the by-products obtained by refining kerosene distillates or light lubricating oils with liquid sulfur dioxide according to the well known Edeleanu process.

We have discovered that the desired lubricating oil dye may be prepared by adding anthracene to the sulfur dioxide extract and treating the mixture with aluminum chloride. The treatment with aluminum chloride consists of heating the mixture under a reflux condenser at temperatures below approximately 200° F. for several hours. The higher temperature is found to be advantageous in increasing the yield of product and decreasing the time of reaction. The mixture is then allowed to stand over night and hydrolyzed at 180° F. by adding hydrochloric acid equivalent to approximately ⅓ to ¼ the volume of the mixture to be hydrolyzed and air agitating the mixture at this temperature over night. The purpose of air blowing is to promote the oxidation of the undesirable and unstable products formed during the reaction, which, if not otherwise removed, would appear in the final product.

The mixture is next filtered through paper in Buchner funnel to remove solid coke particles which settle out during air agitation, and the filtrate is washed with three (30 to 50% on the filtrate) water washes until free of chloride content. The sample is next dried by air blowing in a water bath and the dry sample subjected to vacuum distillation. After the unreacted SO₂ extract has been distilled off under moderate vacuum (water pump), the residual mixture is taken overhead under 1″ Hg. absolute pressure. The first portion consists of a waxy-like material which shows faint dyeing properties. The second portion is the desired dye stock. The residue of the distillation constitutes a third portion and consists of solid black resinous materials with slightly less dyeing properties than the second portion.

The following example will illustrate our process:

Two parts of anthracene and ten parts of sulfur dioxide extract obtained by refining a kerosene fraction and one part of aluminum chloride were refluxed at 100–200° F. for 8 hours. The solution was hydrolyzed at 180° by adding hydrochloric acid, equivalent to ⅓ or ¼ the volume of the mixture to be hydrolyzed, and air agitating the mixture overnight at this temperature. The mixture was next filtered on a Buchner funnel to remove the solid coky materials and the clear filtrate washed with water (30 to 50% washes) until free of chloride content, and finally dried by blowing with air at 200°. The solution was then submitted to distillation under a pressure of one inch of mercury. First an apparently unchanged sulfur dioxide extract came over, amounting to about 15% of the solution submitted to distillation. The further distillation yielded three portions. The first portion was a waxy yellow liquid with faint dyeing properties and amounted to about 10%. The second portion was a viscous red oil which solidified upon cooling and had excellent dyeing properties. This portion, which amounted to about 25% of the oil submitted to a distillation, was used for dyeing lubricating oils. The third portion was a residue and consisted of solid black resinous materials with slightly less dyeing properties than the second portion. Its amount was about 50%. Samples of lubricating oils dyed with similar portions of this fraction gave good colors but the cast was slightly dead in appearance.

Naphthalene or other aromatic hydrocarbon with condensed nuclei may be used instead of the anthracene, although the best dyes are obtained by using anthracene.

The dye stock obtained by our process will impart a green fluorescence to lubricating oils when added in concentrations as low as 0.06%. The amount actually used may be anywhere between .06–.25% by weight.

Having thus described our invention, what we claim is:

1. The process of preparing a dye stock capable of imparting green fluorescence to petroleum lubricating oils which comprises adding anthracene to a sulfur dioxide extract obtained by treating petroleum distillate with liquid sulfur dioxide, heating the mixture of anthracene and sulfur dioxide extract with aluminum chloride, and separating the aluminum chloride from the reaction mixture.

2. The process according to claim 1 in which the mixture is heated with aluminum chloride at a temperature of from 100 to 200° F.

3. The process according to claim 1 in which the aluminum chloride treated mixture is hydrolyzed with dilute hydrochloric acid, air agitated, filtered and the filtrate washed with water until the last traces of chloride are removed, and then submitted to fractional vacuum distillation to obtain the desired dye stock as one of the fractions.

4. The process which comprises adding an aromatic hydrocarbon with condensed nuclei to a sulfur dioxide extract obtained by treating petroleum distillate with liquid sulfur dioxide, heating the mixture of aromatic hydrocarbon with condensed nuclei and sulfur dioxide extract with aluminum chloride, and separating the aluminum chloride from the reaction mixture.

5. The process which comprises adding naphthalene to a sulfur dioxide extract obtained by treating petroleum distillate with liquid sulfur dioxide, heating the mixture of naphthalene and sulfur dioxide extract with aluminum chloride, and separating the aluminum chloride from the reaction mixture.

6. The process according to claim 5 in which the mixture is heated with aluminum chloride at a temperature within the approximate limits of from 100° to 200° F.

7. The process according to claim 5 in which the mixture after being heated with aluminum chloride is hydrolyzed, filtered, the filtrate washed with water until the last traces of chloride are removed, and then submitted to fractional vacuum distillation to obtain a lubricating oil dye stock as one of the fractions.

8. Process according to claim 4 in which the mixture is heated with aluminum chloride at a temperature within the approximate limits of from 100° to 200° F.

9. Process according to claim 4 in which the mixture after being heated with aluminum chloride is hydrolyzed, filtered, the filtrate washed with water until the last traces of chloride are removed, and then submitted to vacuum distillation to obtain a lubricating oil dye stock as one of the fractions.

SHERMAN S. SHAFFER
EGI V. FASCE.